United States Patent
Dakshinamurthy et al.

(10) Patent No.: US 10,948,515 B2
(45) Date of Patent: Mar. 16, 2021

(54) DATA CORRECTION FOR A SENSOR

(71) Applicant: InvenSense, Inc., San Jose, CA (US)

(72) Inventors: Sriraman Dakshinamurthy, San Jose, CA (US); Michael Perrott, Cambridge, MA (US); Amaresh Malipatil, San Jose, CA (US); William Kerry Keal, Santa Clara, CA (US); Andy F. Milota, San Ramon, CA (US)

(73) Assignee: InvenSease, Inc., San Jose, CA (US)

( * ) Notice: Subject to any disclaimer, the term of this patent is extended or adjusted under 35 U.S.C. 154(b) by 766 days.

(21) Appl. No.: 15/374,898

(22) Filed: Dec. 9, 2016

(65) Prior Publication Data

US 2018/0164125 A1 Jun. 14, 2018

(51) Int. Cl.
*G01R 35/00* (2006.01)
*G01P 21/00* (2006.01)
*G01C 19/5776* (2012.01)
*G01P 15/08* (2006.01)

(52) U.S. Cl.
CPC .......... *G01P 21/00* (2013.01); *G01C 19/5776* (2013.01); *G01P 15/08* (2013.01)

(58) Field of Classification Search
USPC ......................................... 702/106
See application file for complete search history.

(56) References Cited

U.S. PATENT DOCUMENTS

| | | | | |
|---|---|---|---|---|
| 4,269,073 A | * | 5/1981 | McIntyre | G01C 19/065 318/714 |
| 6,208,671 B1 | * | 3/2001 | Paulos | H03H 17/0628 341/61 |
| 6,982,538 B2 | * | 1/2006 | White | G01C 19/56 318/702 |
| 8,490,462 B2 | * | 7/2013 | Swanson | G01P 15/125 73/1.38 |
| 2016/0231117 A1 | * | 8/2016 | Lloyd | G01C 19/5776 |

* cited by examiner

*Primary Examiner* — Aditya S Bhat (57) ABSTRACT

A device may include a sensor, a sampling unit, and an interpolator. The sensor may be configured to sense motion and output a sensed signal. The sampling unit may be configured to sample the sensed signal with a sensor clocking signal to generate a plurality of sampled values. The interpolator may be coupled to the sampling unit and may be configured to receive the plurality of sampled values, the sensor clocking signal, and a reference clocking signal external to the device. The interpolator may be configured to interpolate the plurality of sampled values based on the reference clocking signal and further based on the sensor clocking signal to generate a plurality of output values.

23 Claims, 9 Drawing Sheets

DATA CORRECTION FOR A SENSOR

BACKGROUND

In general, sampling data sensed by a sensor is inaccurate because of using inaccurate clocking source. Moreover, the inaccuracy increases from one sensor to the next due to manufacturing variability as well as temperature variations. Various methods have been used to address the inaccuracies associated with sampling of the sensed data, e.g., using a host processor that resides off the sensor chip to correct for the inaccuracies, using a high frequency phase locked loop, etc. Unfortunately in applications where a host processor or a high frequency phase locked loop is used, a higher amount of power is consumed.

SUMMARY

Accordingly, a need has arisen to address inaccuracies associated with the sensed sample data of a sensor while maintaining a low power consumption. According to some embodiments, instead of using a host processor that is external to the sensor chip or instead of using a high frequency phased locked loop, a low power interpolator circuitry within a sensor chip may be utilized. As such, the inaccuracies associated with the sensed data of the sensor may be addressed and corrected within the sensor chip without a substantial increase in power consumption.

According to some embodiments, a device may include a sensor configured to sense motion and output a sensed signal. The device may also include a sampling unit, e.g., a decimator, configured to sample the sensed signal with a sensor clocking signal to generate a plurality of sampled values. Moreover, the device may include an interpolator coupled to the sampling unit. The interpolator may be configured to receive the plurality of sampled values. Furthermore, the interpolator may further be configured to receive the sensor clocking signal and a reference clocking signal external to the device. In some embodiments, the interpolator is configured to interpolate the plurality of sampled values based on the reference clocking signal and further based on the sensor clocking signal to generate a plurality of estimated sampled values. In some embodiments, the reference clocking signal is selected from a group consisting of a real time clock and a system clock.

It is appreciated that an output value of the plurality of estimated sampled values may temporally occur between two consecutive sampled values of the plurality of sampled values. It is also appreciated that the sensor may be a gyroscope, an accelerometer, etc.

According to some embodiments, the interpolator is a first order interpolator. However, in other embodiments, the interpolator is a second order interpolator. According to some embodiments, the interpolator is configured to convert the plurality of sampled values from a time domain associated with the sensor clocking signal to another time domain associated with the reference clocking signal. It is appreciated that the plurality of estimated sampled values may be transmitted to a host processor that is positioned outside of the device.

According to some embodiments, the device may further include a phase locked loop configured to lock onto resonance frequency of the sensor. The phase locked loop may be configured to output the sensor clocking signal to the sampling unit.

In some embodiments, a system may include a sensor chip and a host processor external to the sensor chip. The sensor chip may include a sensor, a sampling unit, and an interpolator. The sensor may be configured to sense motion and output a sensed signal. The sampling unit may be configured to sample the sensed signal with a sensor clocking signal to generate a plurality of sampled values. The interpolator may be coupled to the sampling unit and may be configured to receive the plurality of sampled values. The interpolator may further be configured to receive the sensor clocking signal and a reference clocking signal external to the sensor chip, and interpolate the plurality of sampled values based on the reference clocking signal and further based on the sensor clocking signal to generate a plurality of estimated sampled values. The host processor may operate by the reference clocking signal and may be configured to receive the interpolated plurality of estimated sampled values from the sensor chip. A correction to a frequency or sampling error is made by the sensor chip to reduce power consumption by the host processor.

It is appreciated that an output value of the plurality of estimated sampled values temporally may occur between two consecutive sampled values of the plurality of sampled values. According to some embodiments the sensor may be a gyroscope, an accelerometer, etc.

According to some embodiments, the interpolator may be a first or a second order interpolator. The interpolator may be configured to convert the plurality of sampled values from a time domain associated with the sensor clocking signal to another time domain associated with the reference clocking signal.

The system may also include a phase locked loop configured to lock onto resonance frequency of the sensor and further configured to output the sensor clocking signal to the sampling unit, e.g., a decimator.

In some embodiments, a method of interpolating sensed signals by a sensor includes sensing a motion to generate a sensed signal. The sensed signal may be sampled with a sensor clocking signal to generate a plurality of sampled values. The sensor clocking signal is received from environment within a sensor chip. The reference clock signal is received from external environment of the sensor chip. The plurality of sampled values is interpolated, e.g., using a zeroth order, a first order or a second order interpolator, based on the sensor clocking signal and the reference clock signal to generate an interpolated value. According to some embodiments, the method may further include transmitting the interpolated value to a host processor that is external to the sensor chip. It is appreciated that the interpolating may correct frequency and sampling errors associated with the sensor clocking signal. The interpolating may make the correction within the environment of the sensor chip at a lower power consumption in comparison to correction within a host processor that is external to the sensor chip.

These and other features and aspects of the concepts described herein may be better understood with reference to the following drawings, description, and appended claims.

DETAILED DESCRIPTION

Before various embodiments are described in greater detail, it should be understood by persons having ordinary skill in the art that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing the certain concepts, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "forward," "reverse," "clockwise," "counter clockwise," "up," "down," or other similar terms such as "upper," "lower," "above," "below," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the embodiments pertain.

A need has arisen to address inaccuracies associated with the sensed sample data of a sensor while maintaining a low power consumption. According to some embodiments, instead of using a host processor that is external to the sensor chip or instead of using a high frequency phased locked loop, a low power interpolator circuitry within a sensor chip may be utilized. As such, the inaccuracies associated with the sensed data of the sensor may be addressed and corrected within the sensor chip without a substantial increase in power consumption.

Figure 1:
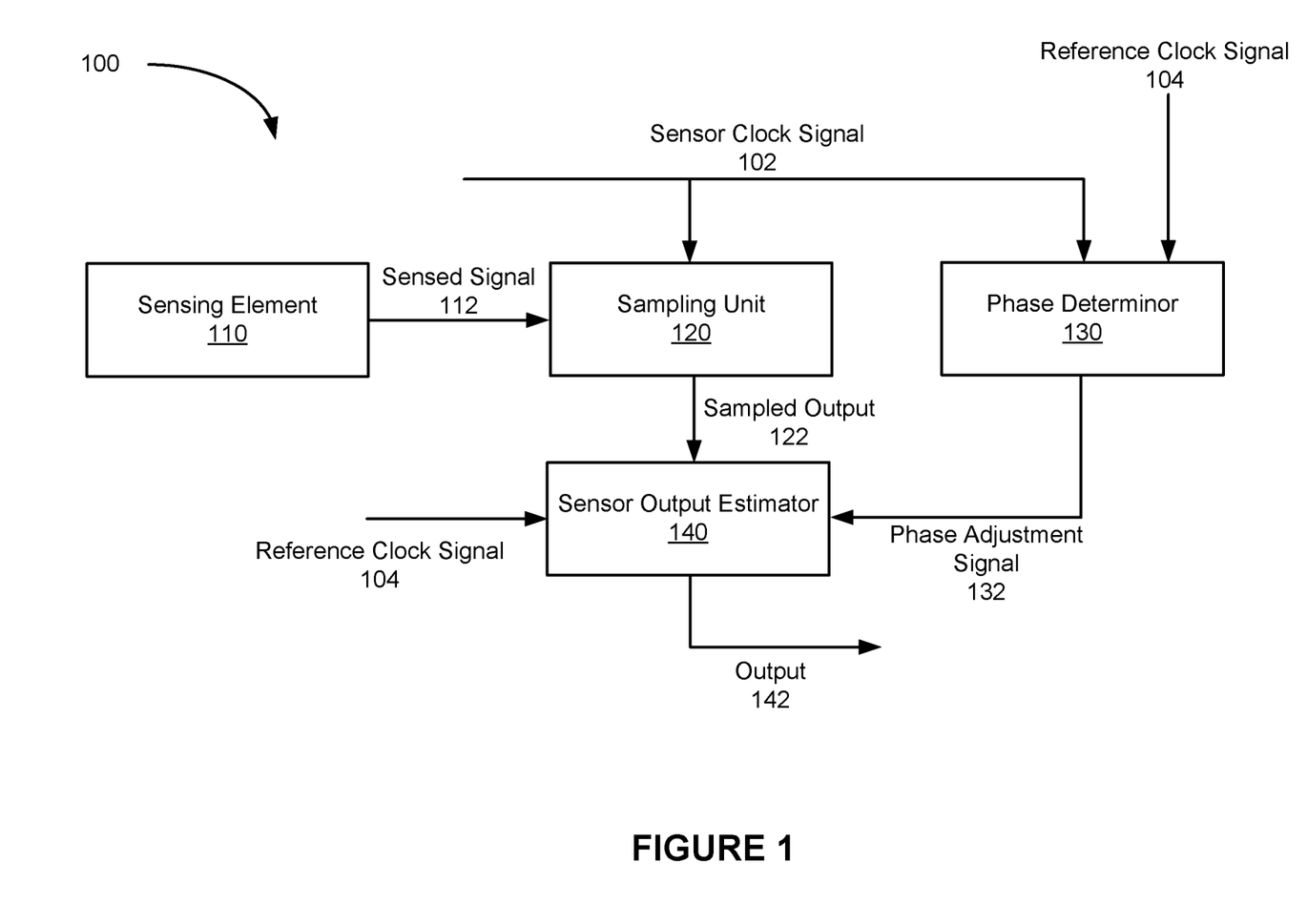
FIG. 1 shows a sensor chip enabled with phase correction according to some embodiments.

Referring now to FIG. 1, a sensor chip enabled with phase correction according to some embodiments is shown. It is appreciated that the sensor chip 100 may generally include two circuitries, a drive circuitry and a sense circuitry. The two circuitries may be integrated with one another or it may be separate from one another. In some embodiments, the sensor chip 100 may include a sensing element 110, a sampling unit 120, a phase determinor 130, and a sensor output estimator 140. The sensing element 110 may be a micro-electromechanical system (MEMS) gyroscope, accelerometer, etc. The sensing element 110 may detect movement, e.g., rotational movement, horizontal movement, acceleration, etc. The sensing element 110 may output a sensed signal 112 in response to detecting a movement. The sensed signal 112 may be transmitted to the sampling unit 120 in some embodiments. It is appreciated that the sensing element may include a drive circuit, a clock synchronization circuit to ensure proper sensing operation, etc. It is further appreciated that the sensing element 110 may be constructed using various circuitry configurations, e.g., open loop architecture, closed loop architecture such as force feedback system, etc. In a force feedback system, the sensed signal may be a force that is applied to the sensor.

The sampling unit 120 may receive the sensed signal 112 from the sensing element 110, in a gyroscope or accelerometer, and it may also receive a sensor clocking signal 102 to sample the sensed signal 112. It is appreciated that in some embodiments, the clocking signal 102 may be generated by the gyroscope whereas in an accelerometer the clocking signal 102 may be generated using an oscillator. In some embodiments, the sampling unit 120 may be an analog to digital convertor and it may further include a decimator component. It is appreciated that the sensor clock signal 102 may be an internal signal within the sensor chip 100. It is also appreciated that sensor clock signal 102 may be a low frequency signal, e.g., 20-40 kHz, and it may be inaccurate, e.g., it may deviate ±10% in addition to temperature variation and part to part variation. In some embodiments, the sensor clock signal 102 may be from a drive signal of the sensing element 110 or a derivative therefrom. Accordingly, the sensor chip 100 consumes minimal power if there is no movement or detection of movement. The sampling unit 120 may sample the sensed signal 112 using the sensor clock signal 102 and output the sampled output 122 to the sensor output estimator 140. It is appreciated that the sampled output 122 may include a plurality of sampled values where each sampled value is associated with a particular time of the sensor clocking signal 102.

In some embodiments, the phase determinor 130 receives the sensor clock signal 102 and it may further receive a reference clock signal 104. The reference clock signal 104 may be a clocking signal external to the sensor chip 100. For example, the reference clock signal 104 may be a system clock, a real time clock (RTC), etc. The phase determinor 130 outputs a phase adjustment signal 132, which may be a calculation of the sampling phase difference between the sensor clock signal 102 and the reference clock signal 104. In other words, the phase adjustment signal 132 represents the shift to phase of the sensor clock signal 102 that needs to be made in order to align the sensor clock signal 102 with the external and more accurate clocking signal, e.g., reference clock signal 104.

According to some embodiments, the sensor output estimator 140 may receive the sampled output 122 signal from the sampling unit 120. The sampled output 122 signal is in the sensor clock signal 102 domain since the sensed signal 112 is sampled using internal signals, e.g., sensor clock signal 102, of the sensor chip 100. The sensor output estimator 140 may further receive the phase adjustment signal 132 from the phase determinor 130 and a reference clock signal 104. It is appreciated that the sampled output 122 signal is synchronous to the reference clock signal 104. In other words, the reference clock signal 104 latches the output of the sensor output estimator 140. In some alternative embodiments, the signal from the sensor output estimator 140 may be stored in a first in first out (FIFO) or a generic register and the use of the reference clock signal 104 may be eliminated. The phase adjustment signal 132 indicates the adjustment in phase of the sensor clocking signal 102 that is desired to convert from the time domain internal to the sensor chip 100 to the time domain external to the sensor chip 100. Since the sensed signal 112 is sampled at sensor clock signal 102 and no sample exists at the sensor clock signal 102 adjusted by the phase based on the phase adjustment signal 132, the sample at the sensor clock signal 102 adjusted by the phase based on the phase adjustment signal 132 is estimated, by the sensor output estimator 140, and the output signal 142 is generated. In other words, the output signal 142 is an estimation of sampling of the sensed signal 112 using the sensor clock signal 102 with the phase adjustment based on the phase adjustment signal 132. Moreover, it is appreciated that the estimated sample value associated with the sensor clock signal 102 adjusted by the phase based on the phase adjustment signal 132 may temporally occur between two consecutive sampled values of the sampled output 122 signal.

Accordingly, the sampling of sensed signal 112 based on the external time domain of the sensor chip 100 may be estimated while maintaining and reducing power consumption. Estimating the sampling of the sensed signal 112 that corresponds to the time domain associated with the environment external to the sensor chip 100 while achieving a high accuracy allows lower power consumption components to be used, e.g., low frequency clocking signal. In addition, it eliminates the need to use a host processor external to the sensor chip 100 to estimate the sampling of the sensed signal, thereby also reducing power consumption.

Figure 2:
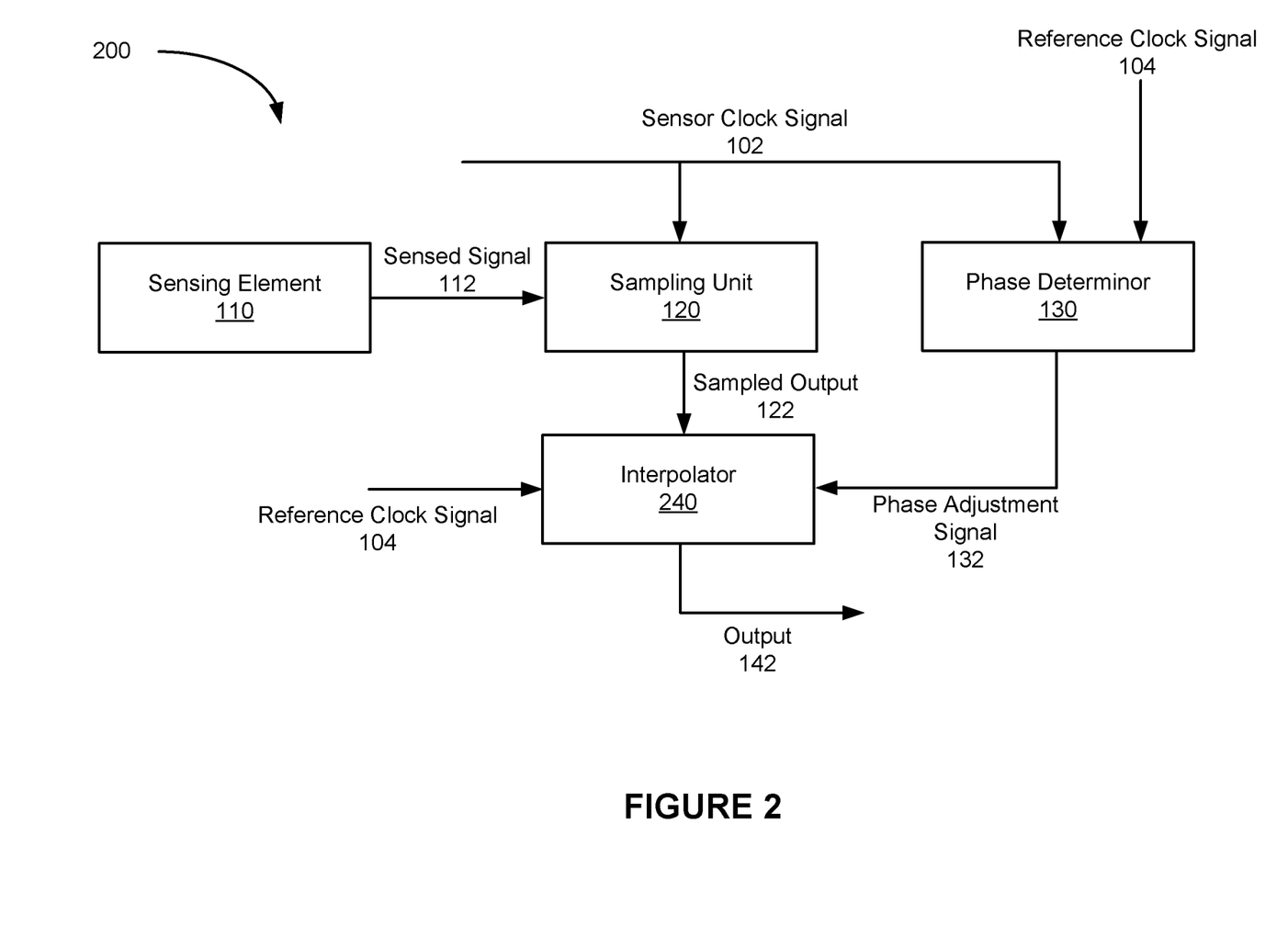
FIG. 2 shows a sensor chip enabled with an interpolator according to some embodiments.

Referring now to FIG. 2, a sensor chip 200 enabled with an interpolator 240 according to some embodiments is shown. It is appreciated that the sensor chip 200 operates substantially similar to that of FIG. 1 except that the sensor output estimator 140 is replaced with the interpolator 240. The interpolator 240 may interpolate and estimate a value of a sample corresponding to sensor clock signal 102 adjusted by the phase based on the phase adjustment signal 132, that is temporally located between two consecutive samples of the sampled output 122. The interpolator 240 may be a zero order interpolator, a first order interpolator, a second order interpolator, or a higher order interpolator.

Figure 3A:
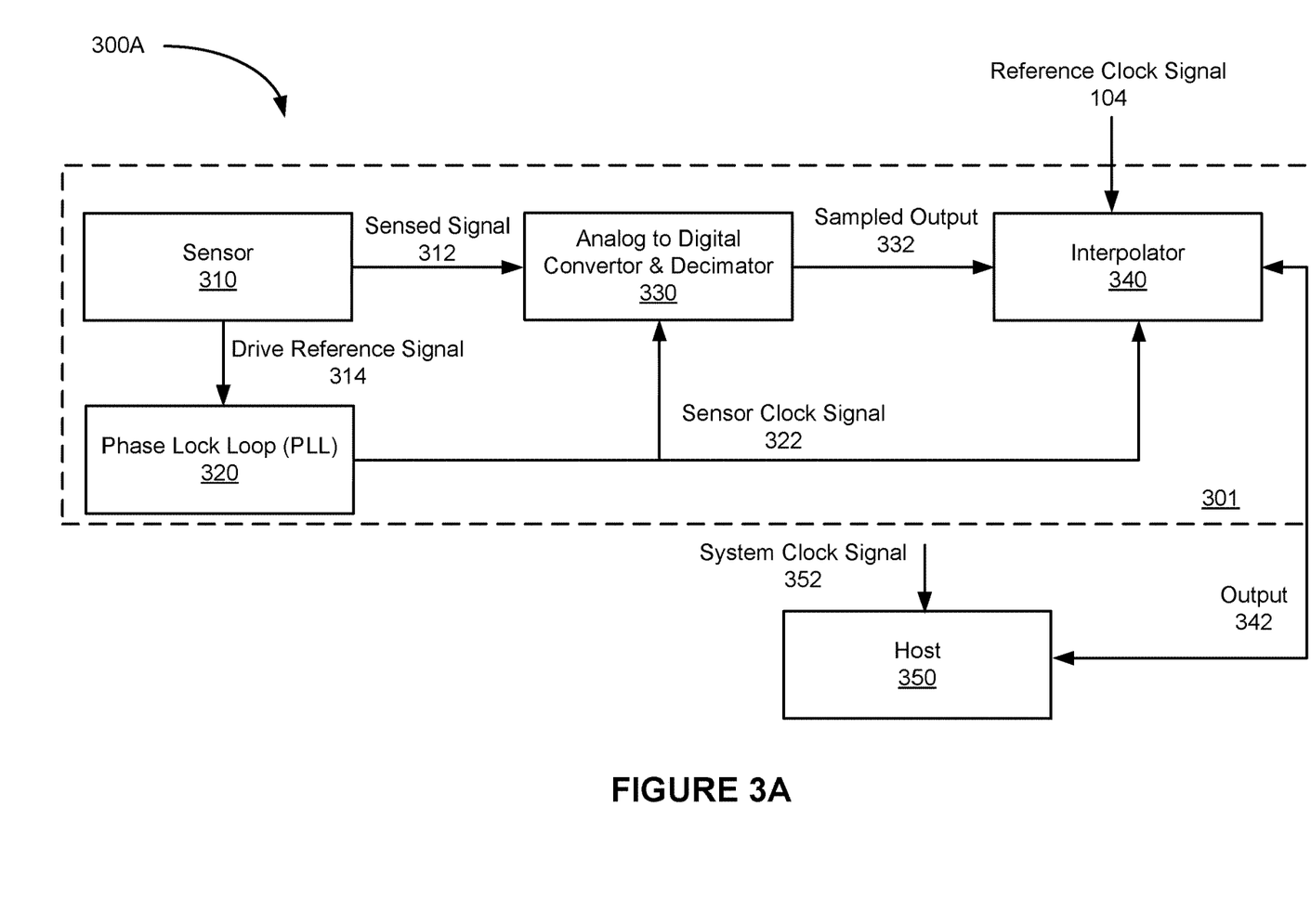
FIGS. 3A-3D show a system according to some embodiments.

Referring now to FIGS. 3A-3D, a system according to some embodiments is shown. Referring specifically to FIG. 3A, the system 300A includes a sensor chip 301 coupled to a host 350. The sensor chip 301 may include a sensor 310, a phase locked loop (PLL) 320, an analog to digital convertor and decimator 330, and an interpolator 340 component. The sensor 310 may be a MEMS gyroscope, accelerometer, a CMOS driver circuit, modulation/demodulation and filtering circuits needed to operate a sensor, etc. The sensor 310 may detect movement, e.g., rotational movement, horizontal movement, acceleration, etc. The sensor 310 may output a sensed signal 312 in response to detecting a movement. The sensed signal 312 may be transmitted to the analog to digital convertor and decimator 330.

It is appreciated that in some embodiments, the sensor 310 may generate and transmit a drive reference signal 314 to the PLL 320 component. The drive reference signal 314 is a generated signal by the sensor 310 when the sensor chip 301 detects motion. The PLL 320 component may be used to lock onto the resonance frequency of the sensed signal 312. The PLL 320 component may generate a sensor clock signal 322 where the phase of the sensor clock signal 322 is aligned with the phase of the sensed signal 312. It is appreciated that the sensor clock signal 322 may be associated with and be proportional to the internal clock signal of the sensor chip 301, e.g., the sensor clock signal 322 may be a fraction or a multiple of the internal clock signal. The PLL 320 component may transmit the sensor clock signal 322 to the analog to digital convertor and decimator 330 and further to the interpolator 340. It is also appreciated that sensor clock signal 322 may be a low frequency signal, e.g., 20-40 kHz, and it may be inaccurate, e.g., it may deviate ±10% in addition to temperature variation and part to part variation. In some embodiments, the sensor clock signal 322 may be related to the drive signal of the sensor 310 or a derivative therefrom. Accordingly, the sensor chip 301 consumes minimal power if there is no movement or detection of movement.

The analog to digital convertor and decimator 330 may receive the sensed signal 312 from the sensor 310 and it may also receive the sensor clock signal 322 to sample the sensed signal 312. The analog to digital convertor and decimator 330 may sample the sensed signal 312 using the sensor clock signal 322 and output the sampled output 322 to the interpolator 340. It is appreciated that the sampled output 332 may include a plurality of sampled values where each sampled value is associated with a particular time associated with the sensor clock signal 322.

According to some embodiments, the interpolator 340 may receive the sampled output 332 signal from the analog to digital convertor and decimator 330. The sampled output 332 signal is in the sensor clock signal 322 domain since the sensed signal is sampled using internal signals, e.g., sensor clock signal 322, of the sensor chip 301. The interpolator 340 may further receive the sensor clock signal 322 and it may further receive the reference clock signal 104. The reference clock signal 104 may be a clocking signal external to the sensor chip 301. For example, the reference clock signal 104 may be a system clock, a real time clock (RTC), etc.

The interpolator 340 may determine a phase difference between the reference clock signal 104 and the sensor clock signal 322. The phase difference between the reference clock signal 104 and the sensor clock signal 322 may represent the shift to phase of the sensor clock signal 322 that needs to be made in order to align the sensor clock signal 322 with the external and more accurate clocking signal, e.g., reference clock signal 104. In other words, the phase difference may indicate the adjustment in phase of the sensor clocking signal 322 that is desired to convert from the time domain internal to the sensor chip 301 to the time domain external to the sensor chip 301. Since the sensed signal 312 is sampled at sensor clock signal 322 and no sample exists at the sensor clock signal 322 adjusted by the phase difference, as determined by the interpolator 340, the sampled output 332 at the sensor clock signal 322 adjusted by the phase difference is estimated, and the estimated sampled signal 342 is generated by the interpolator 340. In other words, the estimated sampled signal 342 is an estimation of sampling of the sensed signal 312 using the sensor clock signal 322 with the phase adjustment based on the phase difference between the reference clock signal 104 and the sensor clock signal 322. Moreover, it is appreciated that the estimated sampled value based on the estimated sampled signal 342 associated with the sensor clock signal 322 adjusted by the phase may temporally occur between two consecutive sampled values of the sampled output 332 signal. It is appreciated that the interpolator 340 may be a first order interpolator, a second order interpolator, or a higher order interpolator.

Accordingly, the sampling of sensed signal 332 based on the external time domain of the sensor chip 301 may be estimated while maintaining and reducing power consumption. Estimating the sampling of the sensed signal 312 that corresponds to the time domain associated with the environment external to the sensor chip 301 while achieving a high accuracy allows lower power consumption components to be used, e.g., low frequency clocking signal. Moreover, using the interpolator 340 internal to the sensor chip 301 reduces power consumption by eliminating the need to estimate the samples using the host processor, e.g., application specific integrated circuit (ASIC), field programmable gate array (FPGA), central processing unit (CPU), etc., residing at the host 350 external to the sensor chip 301, which consumes more power than the interpolator 340.

The estimated sampled values may be transmitted as the estimated sampled signal 342 signal to the host 350. The host 350 may perform additional processing on the received estimated sampled signal 342. It is appreciated that the host 350 may receive the estimated sampled signal 342 signal in response to transmitting an interrupt signal to the sensor chip 301. In other embodiments, the host 350 may receive the estimated sampled signal 342 signal in predetermined intervals, e.g., once every few minutes, once every few hours, etc. It is appreciated that the host 350 may be operated using a system clock signal 352. In some embodiments, the system clock signal 352 may be the same or some derivative of the reference clock signal 104.

Figure 3B:
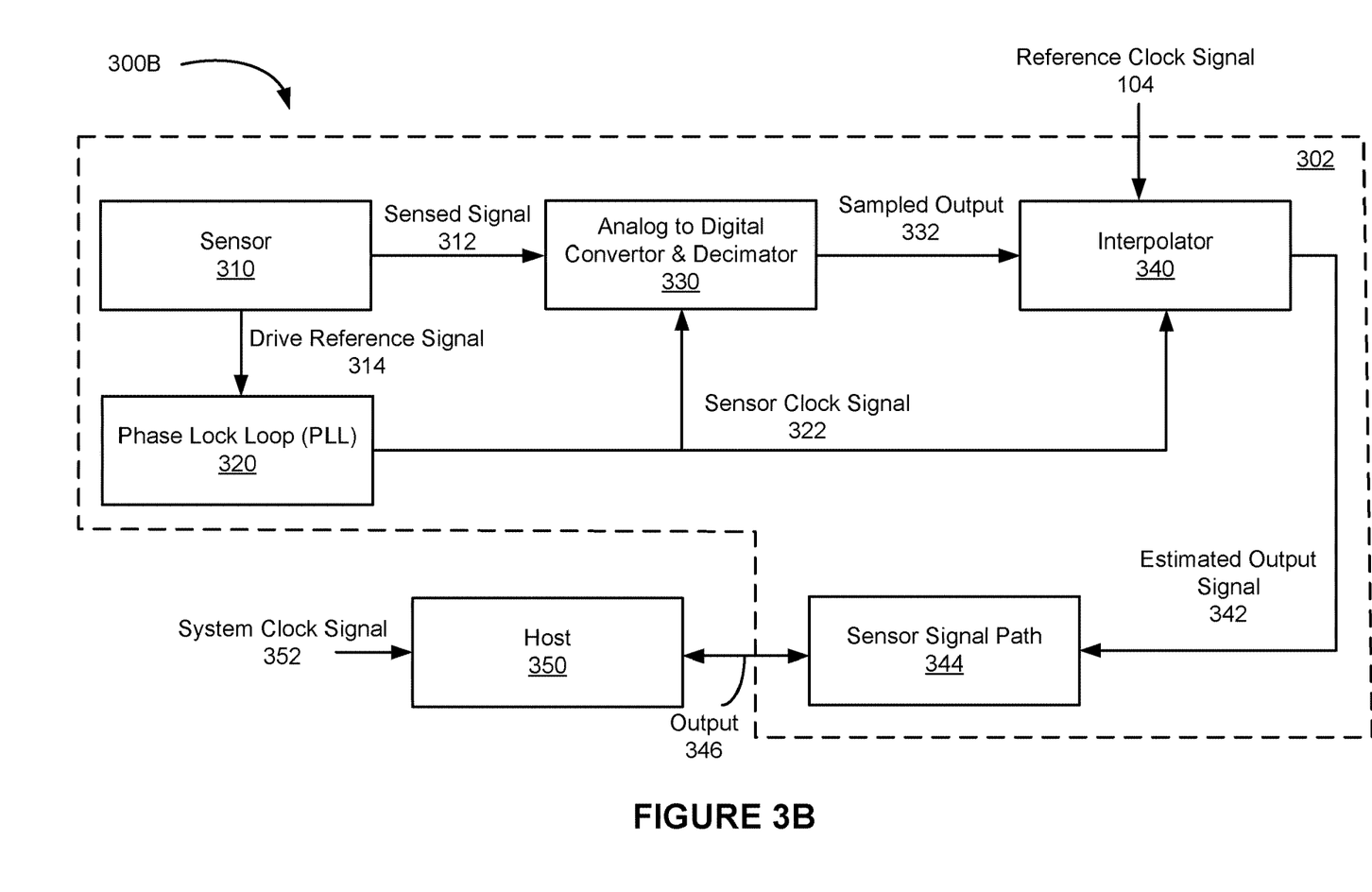

Referring now to FIG. 3B, sensor chip 302 is coupled to the host 350. The sensor chip 302 operates substantially similar to 301 of FIG. 3A. However, in this embodiment, the sensor chip 302 further includes a sensor signal path component 344 that is coupled to the interpolator 340. The sensor signal path component 344 may include circuitry to drop the operating frequency to a lower level in order to reduce power consumption. In this embodiment, the estimated sampled signal 342 is transmitted from the interpolator 340 to the sensor signal path 344 in order to drop the operating frequency. The sensor signal path 344 then outputs the output 346 signal to the host 350. The output signal 346 is the estimated sampled signal 342 but at a lower frequency.

Figure 3C:
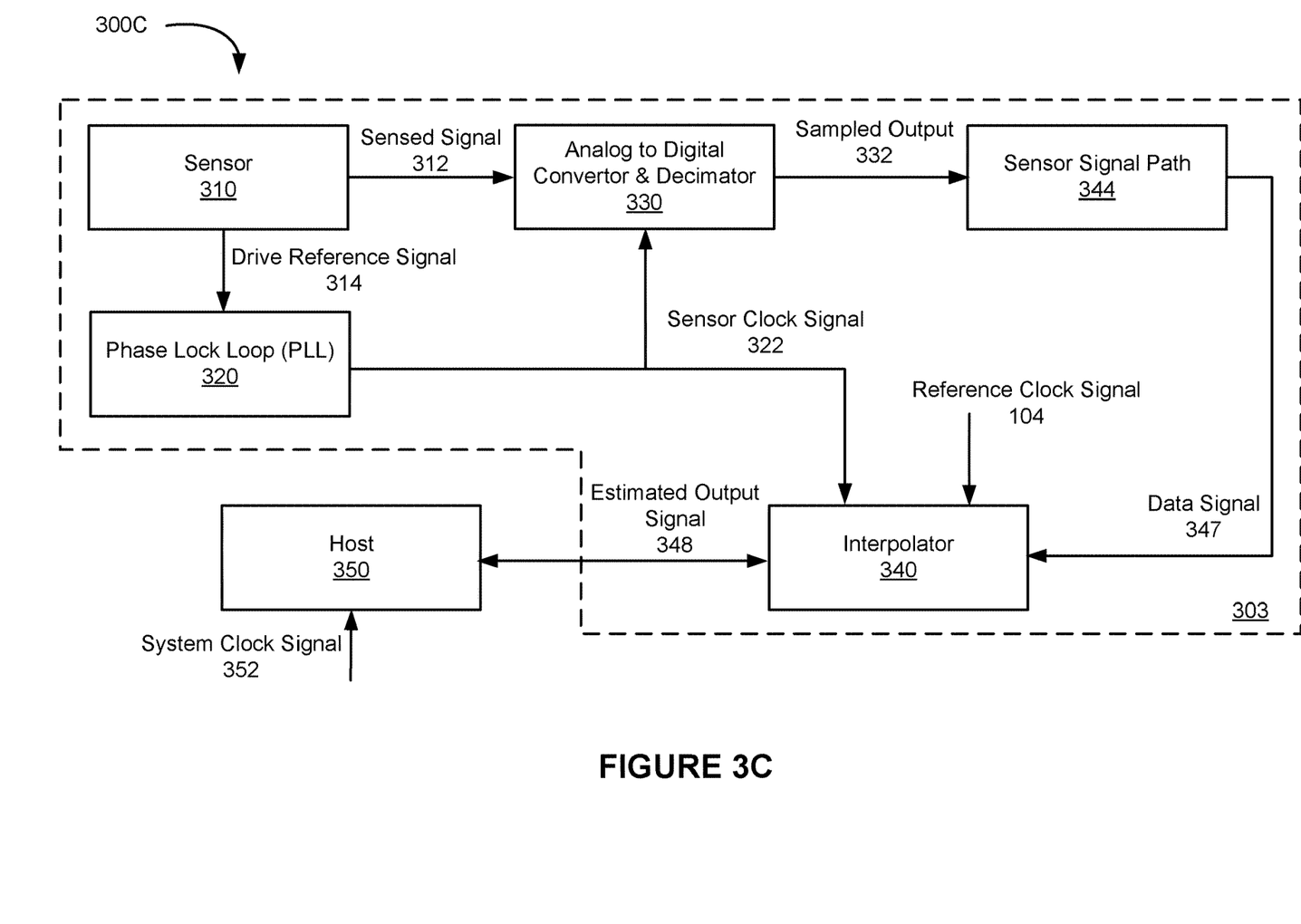

Referring now to FIG. 3C, sensor chip 303 is coupled to the host 350. The sensor chip 303 operates substantially similar to that of FIG. 3B. However, in this embodiment, the generated sampled output signal 332 is transmitted to the sensor signal path 344 in order to drop the frequency down first before transmission to the interpolator 340. The sensor signal path 344 generates a data signal 347, which is the sampled output 332 signal at a lower frequency. The interpolator 340 receives the data signal 347 and generates the estimated output signal 348, similar to FIGS. 3A-3B.

Figure 3D:
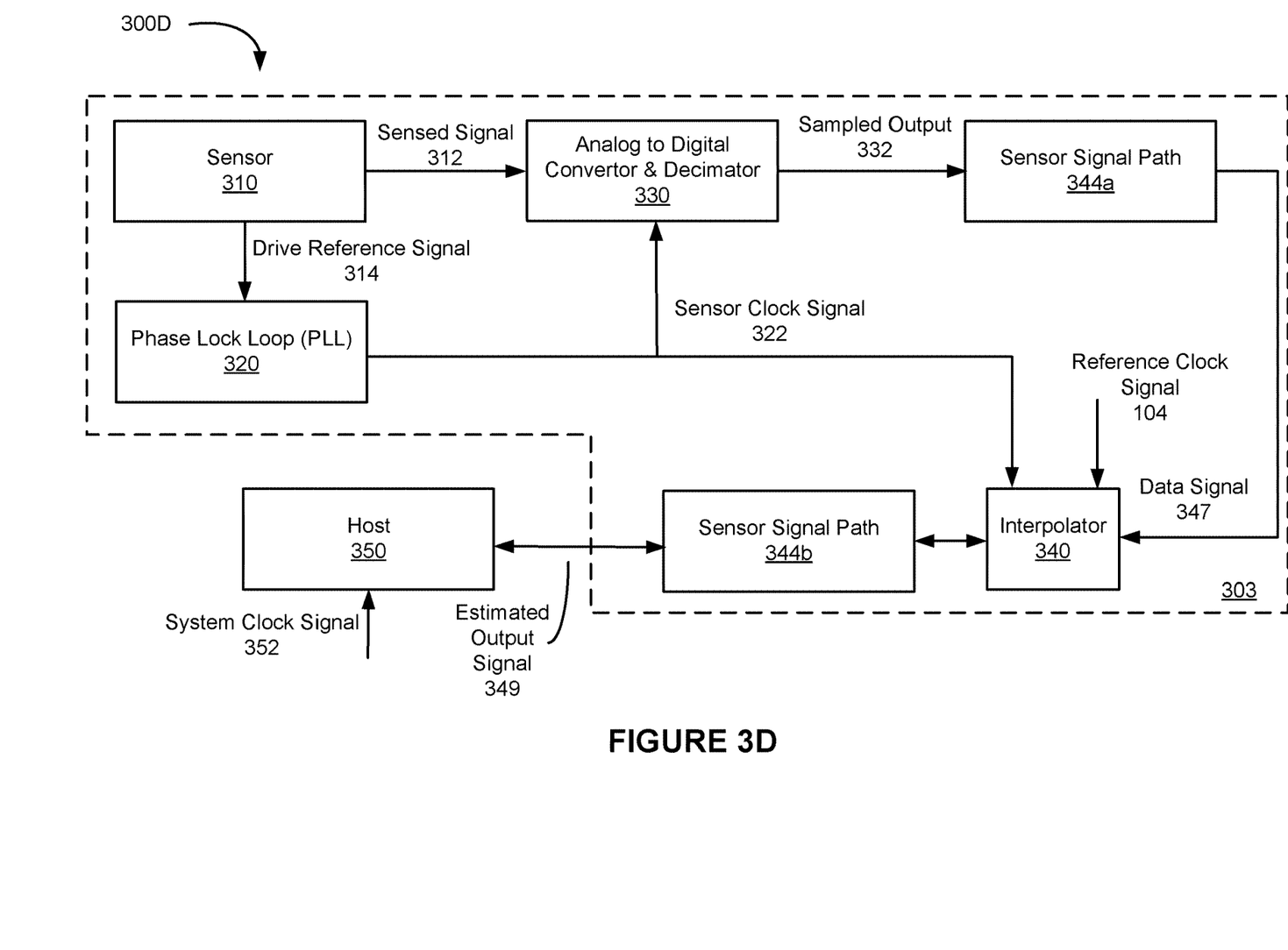

Referring now to FIG. 3D, sensor chip 303 is coupled to the host 350. The sensor chip 303 operates substantially similar to that of FIGS. 3B and 3C. However, in this embodiment, the generated sampled output signal 332 is transmitted to the sensor signal path 344a in order to drop the frequency down first before transmission to the interpolator 340. The sensor signal path 344 generates a data signal 347, which is the sampled output 332 signal at a lower frequency. The interpolator 340 receives the data signal 347 and generates the estimated output signal and transmits the estimated output signal to sensor signal path 344b in order to further drop the frequency down before transmitting the estimated output signal 349 out to the host 350.

It is appreciated that in FIGS. 3A-3D, the PLL 320 may also be a clock source to the sensor 310 by feeding a signal to the sensor 310 (not shown). As such, the embodiments discussed with respect to FIGS. 3A-3D are for illustrative purposes and should not be construed as limiting the scope of the embodiments.

A zeroth order Interpolator can be implemented as $$f(x)=y_0 \quad \text{Equation (1)}.$$

where y0 is the most recent sample that is close the Reference Clock edge. Alternatively, a zeroth order interpolator can also be implemented as by taking the sample that is closes to the reference clock sample, as shown by equation 2 below.

$$f(x)=y_0 \text{ if } \delta<T/2$$

$$f(x)=y_1 \text{ if } \delta>T/2 \quad \text{Equation (2)}.$$

Figure 4:
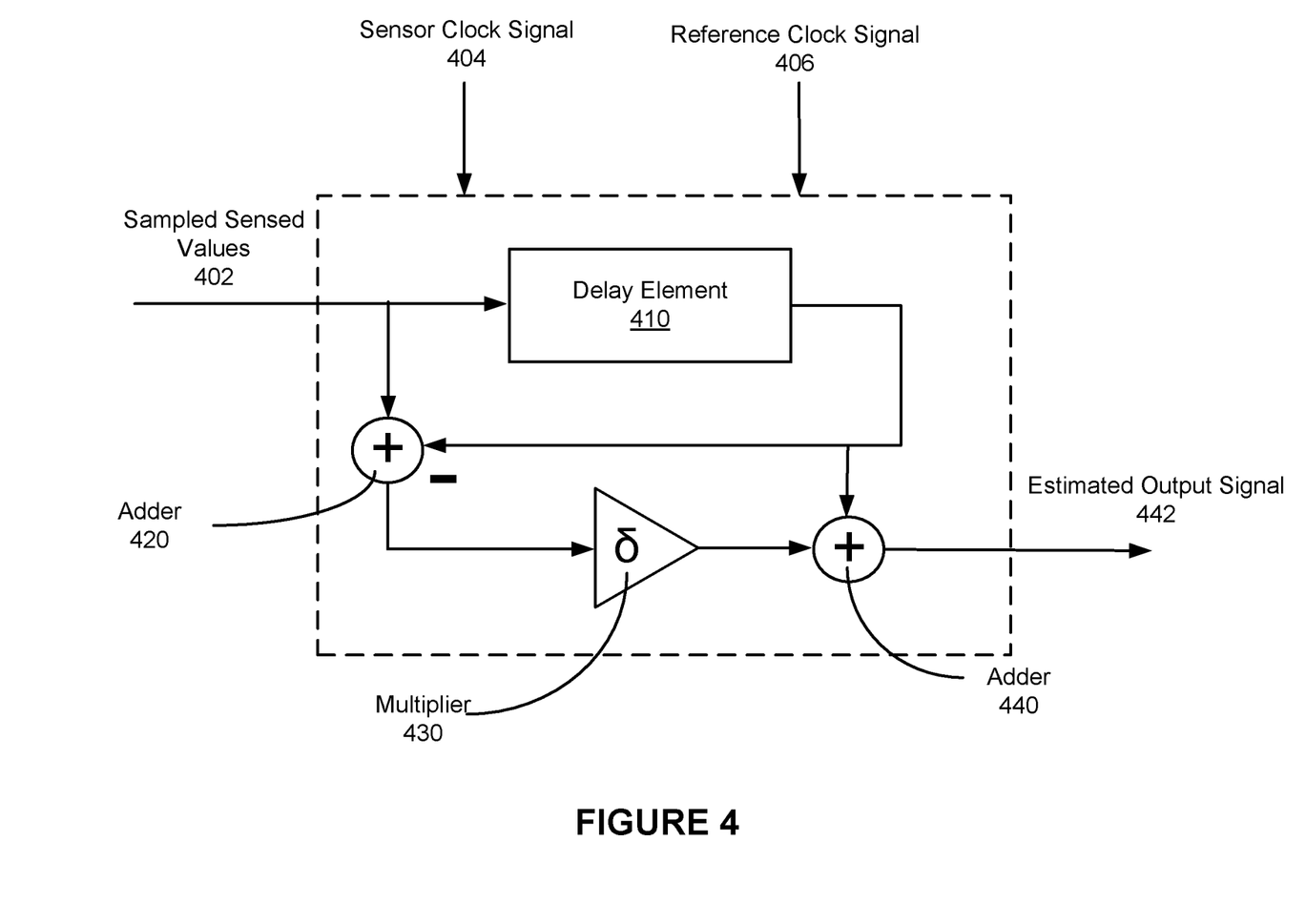
FIG. 4 shows a first order interpolator of a sensor chip in accordance with some embodiments.

Referring now to FIG. 4, a first order interpolator of a sensor chip in accordance with some embodiments is shown. The interpolator may receive the sampled sensed values 402, the sensor clock signal 404, and the reference clock signal 406 and it may generate and output the estimated sampled signal 442. It is appreciated that the sampled sensed values 402, the sensor clock signal 404, the reference clock signal 406, and the estimated sampled signal 442 are the same as sampled output 332/122, the sensor clock signal 322/102, the reference clock signal 104, and the estimated sampled signal 142/342/348 respectively. According to some embodiments, the first order interpolator may be implemented based on the following equation:

$$f^\wedge(x) = y_0 + \frac{\delta}{T}(y_1 - y_0). \quad \text{Equation (3)}$$

It is appreciated that δ is the difference in time between the sampling time of the internal clock of the sensor chip, e.g., sensor clock signal 322, and the reference clock, e.g., reference clock signal 104. Moreover, it is appreciated that $y_0$ and $y_1$ are two consecutive sampled values based on the internal clock of the sensor chip and T is the period associated with the internal clock of the sensor chip that the sensed signal is being sampled.

As shown in FIG. 4, the first ordered interpolator may include a delay element 410, adders 420 and a multiplier 430 in order to generate the estimated sampled signal 442 in accordance with equation (3). According to some embodiments, δ=δ/T.

Figure 5:
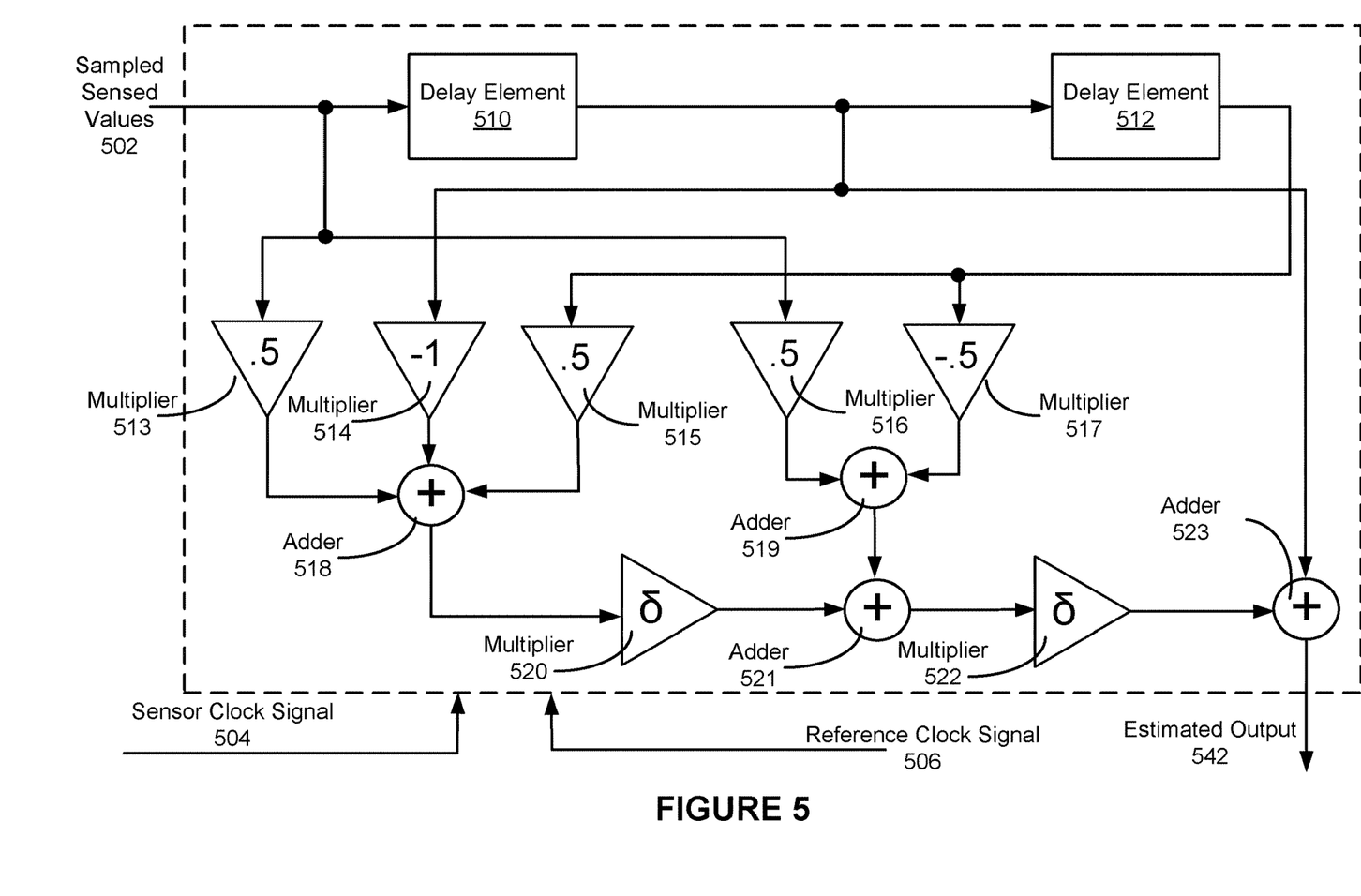
FIG. 5 shows a second order interpolator of a sensor chip in accordance with some embodiments.

Referring now to FIG. 5, a second order interpolator of a sensor chip in accordance with some embodiments is shown. The interpolator may receive the sampled sensed values 502, the sensor clock signal 504, and the reference clock signal 506 and it may generate and output the estimated sampled signal 542. It is appreciated that the sampled sensed values 502, the sensor clock signal 504, the reference clock signal 506, and the estimated sampled signal 542 are the same as sampled output (332/122), the sensor clock signal 322/102, the reference clock signal 104, and the estimated sampled signal 142/342/348 respectively. According to some embodiments, the first order interpolator may be implemented based on the following equation:

$$f^\wedge(x) = y_0 + \frac{\delta}{2T}(y_2 - y_0) + \frac{\delta^2}{2T^2}(y_0 - 2y_1 + y_2). \quad \text{Equation (4)}$$

It is appreciated that δ is the difference in time between the sampling time of the internal clock of the sensor chip, e.g., sensor clock signal 322, and the reference clock, e.g., reference clock signal 104. Moreover, it is appreciated that $y_0$, $y_1$, and $y_2$ are three consecutive sampled values based on the internal clock of the sensor chip and T is the period associated with the internal clock of the sensor chip that the sensed signal is being sampled.

As shown in FIG. 5, the second ordered interpolator may include a delay elements 510 and 512, adders 518-519, 521, and 523, and multipliers 513-517, 520 and 522 in order to generate the estimated sampled signal 542 in accordance with equation (2). According to some embodiments, $\delta=\delta/T$. It is appreciated that the second ordered interpolator based on equation (4) above is exemplary and not intended to limit the scope of the embodiments. For example, other types of second ordered interpolator may be used.

Figure 6:
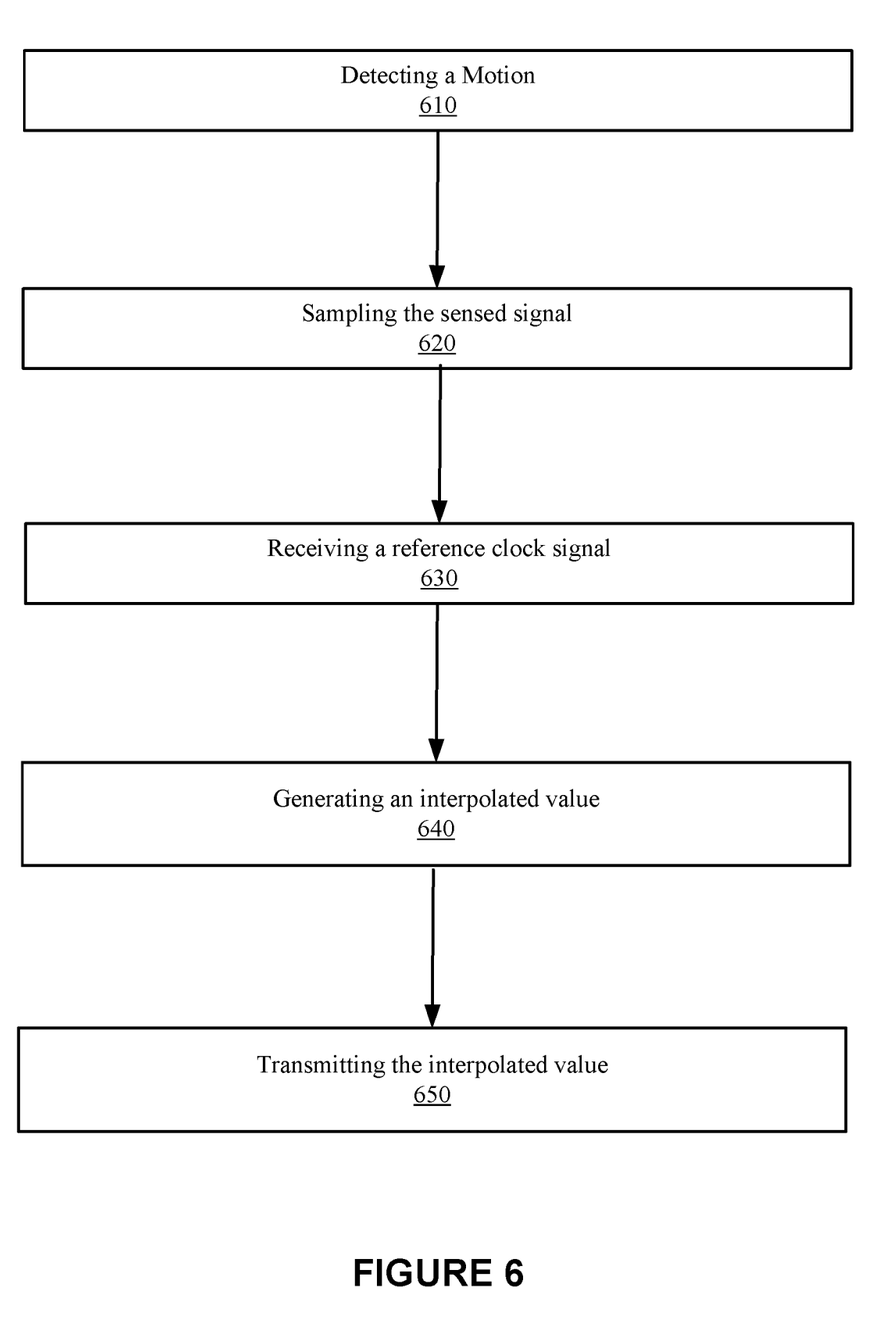
FIG. 6 shows a flow diagram for estimating sampled values in accordance with some embodiments.

Referring now to FIG. 6, a flow diagram for estimating sampled values in accordance with some embodiments is shown. At step 610, a motion, e.g., a movement, an acceleration, etc., is sensed and detected. A sensed signal may be generated. For example, a motion may be sensed using a sensing element 110 or a sensor 310, as described above with respect to FIGS. 1-3C. At step 620, the sensed signal may be sampled to generate the sampled signal comprising a plurality of sampled values. It is appreciated that the sensed signal may be sampled with a sensor clocking signal, e.g., sensor clocking signal 102/322. The sensor clocking signal is a signal originating from within the sensor chip environment. At step 630, a reference clock signal is received. The reference clock signal may be the reference clock signal 104 and it may be received from an environment external to the sensor chip.

At step 640, the plurality of sampled values based on the sensor clocking signal and further based on the reference clock signal may be used to generate an interpolate value. For example, an interpolator, e.g., a first ordered interpolator, a second ordered interpolator, etc., may be used. For example, the sensor output estimator 140, an interpolator 240, or the interpolator 340 in accordance with FIGS. 1-5 may be used. In some embodiments, at step 650, the interpolated value may be transmitted to a host, external to the sensor chip for further processing. The host may include a host processor. It is appreciated that the use of the interpolator to interpolate the interpolated value may correct frequency and sampling errors that are associated with the use of sensor clocking signal, that is generally inaccurate. It is further appreciated that since an internal sensor clocking signal and since the interpolator is placed within the sensor chip, the amount of power consumption is reduced because the use of high power consuming processor to correct for these errors is eliminated. Moreover, slower frequency clock, internal to the sensor chip, that uses less power may be used instead of higher frequency clocking signal that consumes more power. As such, the amount of power consumption is reduced while a more accurate estimation of the sampling of the sensed signal is generated.

The reference clock can also be coupled to a counter. The result of the counter can be used to record when sample is taken. The recorded value of the counter is a timestamp that can accompany the sample in a register or FIFO. This counter can also be available to read in the FIFO or as a register. One of the benefits is that a host may take some time when reading the data sample and having the timestamp on the sample, plus the current value of the counter allows the host to know how long ago the sample was taken. This is useful with a zero'th order interpolator.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A device comprising:
a sensor includes a drive circuitry and a sense circuitry, the sensor configured to sense motion and output a sensed signal, wherein the sense circuitry includes:
a sampling unit configured to receive and sample the sensed signal with a sensor clocking signal received from the drive circuitry to generate a plurality of sampled values; and
an interpolator within the sense circuitry configured to receive the plurality of sampled values from the sampling unit, and wherein the interpolator is further configured to receive the sensor clocking signal and a reference clocking signal external to the device, and wherein the interpolator is configured to interpolate the plurality of sampled values based on the reference clocking signal and further based on the sensor clocking signal to generate a plurality of estimated sampled values.

2. The device as described by claim 1, wherein an estimated sampled value of the plurality of estimated sampled values is between two consecutive sampled values of the plurality of sampled values.

3. The device as described by claim 1, wherein the sensor is a gyroscope.

4. The device as described by claim 1, wherein the interpolator is a first order interpolator.

5. The device as described by claim 1, wherein the interpolator is a zero order interpolator.

6. The device as described by claim 1, wherein the interpolator is a second order interpolator.

7. The device as described by claim 1, wherein the interpolator is configured to convert the plurality of sampled values from a time domain associated with the sensor clocking signal to another time domain associated with the reference clocking signal.

8. The device as described by claim 1, wherein the plurality of estimated sampled values is transmitted to a host processor that is positioned outside of the device.

9. The device as described by claim 1 further comprising:
a phase locked loop configured to lock onto resonance frequency of the sensor and further configured to output the sensor clocking signal to the sampling unit.

10. The device as described by claim 1, wherein the sampling unit is a decimator.

11. The device as described by claim 1, wherein the reference clocking signal is selected from a group consisting of a real time clock and a system clock.

12. The device as described by claim 1, wherein the referencing clocking signal is used to timestamp the plurality of sampled values.

13. A system comprising:
a sensor chip including:
a sense component configured to sense motion and output a sensed signal;
a drive circuitry and a sense circuitry, wherein the sense circuitry includes:

a sampling unit configured to receive and sample the sensed signal with a sensor clocking signal received from the drive circuitry to generate a plurality of sampled values; and an interpolator within the sense circuitry configured to receive the plurality of sampled values from the sampling unit, and wherein the interpolator is further configured to receive the sensor clocking signal and a reference clocking signal external to the sensor chip, and wherein the interpolator is configured to interpolate the plurality of sampled values based on the reference clocking signal and further based on the sensor clocking signal to generate a plurality of estimated sampled values; and a host processor external to the sensor chip, wherein the host processor operates by the reference clocking signal and is configured to receive the interpolated plurality of estimated sampled values from the sensor chip, wherein a correction to a frequency or sampling error is made by the sensor chip to reduce power consumption by the host processor.

14. The system as described by claim 13, wherein an output value of the plurality of estimated sampled values temporally occurs between two consecutive sampled values of the plurality of sampled values.

15. The system as described by claim 13, wherein the sensor is a gyroscope.

16. The system as described by claim 13, wherein the interpolator is selected from a group consisting of a first order interpolator and a second order interpolator.

17. The system as described by claim 13, wherein the interpolator is configured to convert the plurality of sampled values from a time domain associated with the sensor clocking signal to another time domain associated with the reference clocking signal.

18. The system as described by claim 13 further comprising:
a phase locked loop configured to lock onto resonance frequency of the sensor and further configured to output the sensor clocking signal to the sampling unit.

19. The system as described by claim 13, wherein the sampling unit is a decimator.

20. A method comprising:
sensing a motion to generate a sensed signal;
sampling the sensed signal, within a sense circuitry, with a sensor clocking signal received from a drive circuitry to generate a plurality of sampled values, wherein the sensor clocking signal is received from environment within a sensor chip;
receiving a reference clock signal, wherein the reference clock signal is received from external environment of the sensor chip; and
interpolating the plurality of sampled values within the sense circuitry based on the sensor clocking signal and the reference clock signal to generate an interpolated value.

21. The method as described by claim 20 further comprising:
transmitting the interpolated value to a host processor that is external to the sensor chip.

22. The method as described by claim 20, wherein the interpolating is through a second order interpolator.

23. The method as described by claim 20, wherein the interpolating corrects frequency and sampling errors associated with the sensor clocking signal, and wherein the interpolating makes the correction within the environment of the sensor chip at a lower power consumption in comparison to correction within a host processor that is external to the sensor chip.

* * * * *

UNITED STATES PATENT AND TRADEMARK OFFICE
CERTIFICATE OF CORRECTION

| | | |
|---|---|---|
| PATENT NO. | : 10,948,515 B2 | |
| APPLICATION NO. | : 15/374898 | |
| DATED | : March 16, 2021 | |
| INVENTOR(S) | : Sriraman Dakshinamurthy et al. | |

It is certified that error appears in the above-identified patent and that said Letters Patent is hereby corrected as shown below:

On the Title Page

Please delete (73) Assignee:
"InvenSease, Inc., San Jose, CA (US)"
And replace with:
InvenSense, Inc., San Jose, CA (US)

Signed and Sealed this
Nineteenth Day of April, 2022

Katherine Kelly Vidal
*Director of the United States Patent and Trademark Office*